Feb. 16, 1965  F. W. BITTNER  3,169,741
FLUID CONDUIT ADJUSTABLE SUPPORT RAMP
Filed Jan. 24, 1963  2 Sheets-Sheet 1
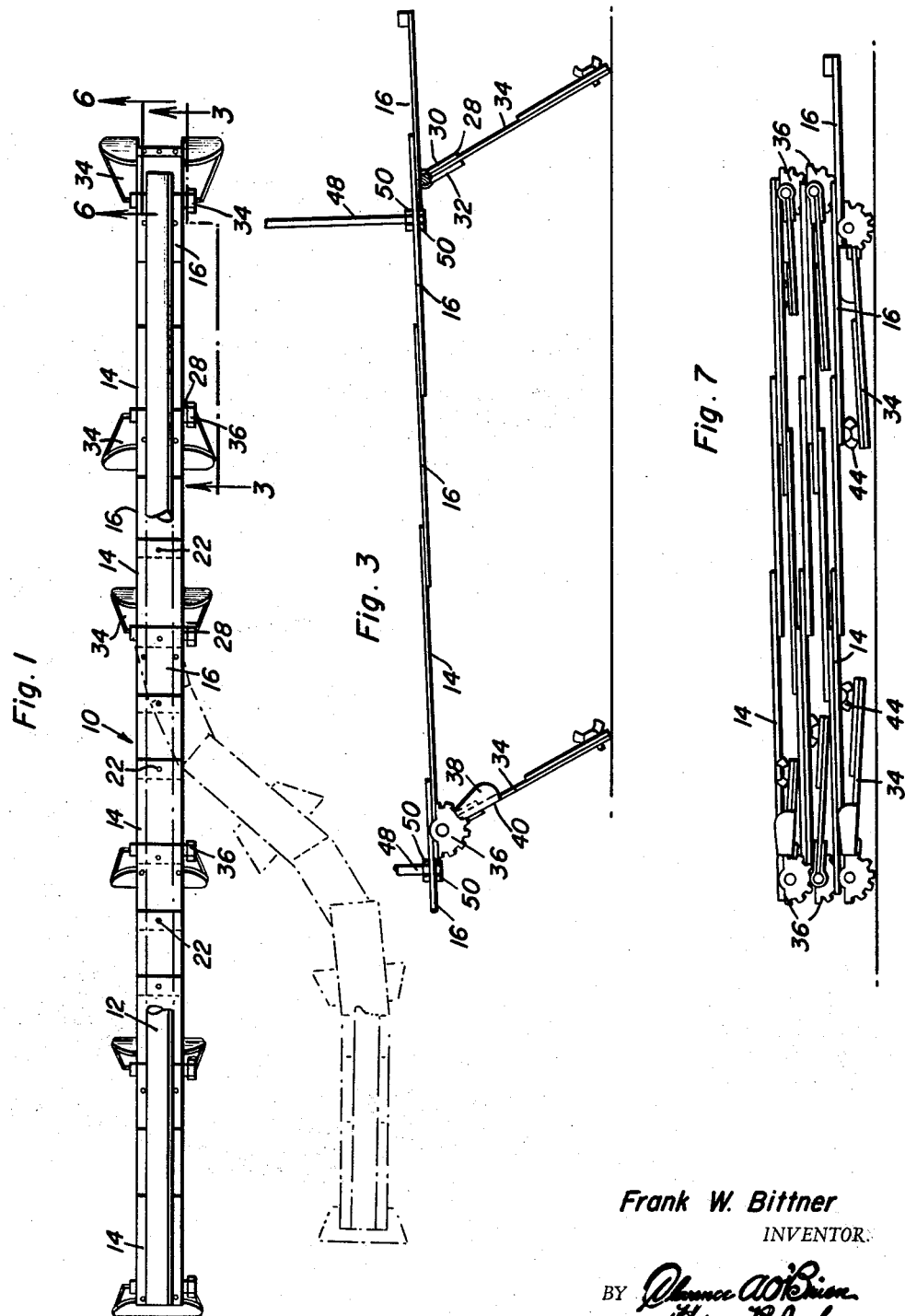
Frank W. Bittner
INVENTOR.

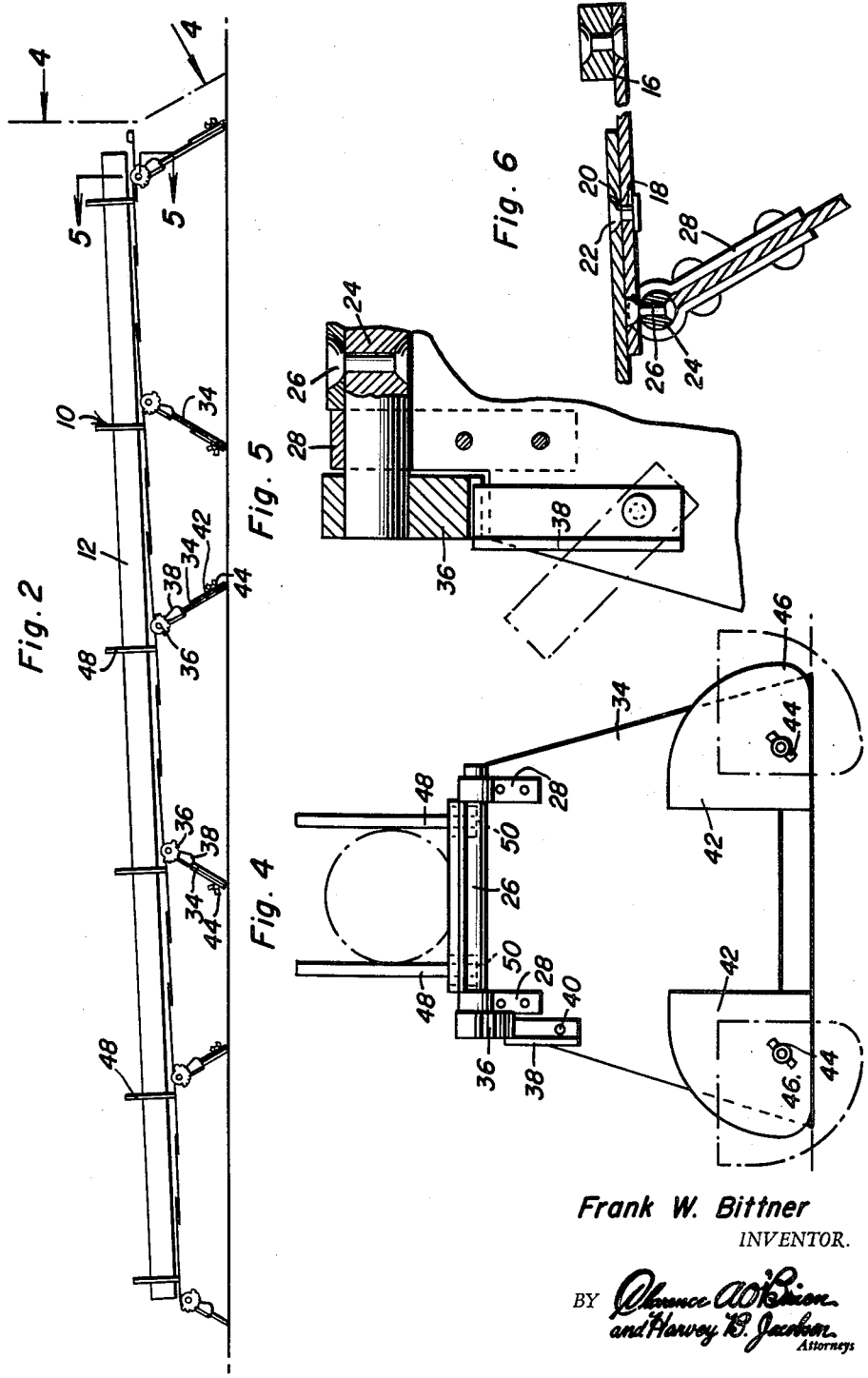

United States Patent Office 3,169,741
Patented Feb. 16, 1965

3,169,741
FLUID CONDUIT ADJUSTABLE SUPPORT RAMP
Frank W. Bittner, 43235 E. Whittier St., Hemet, Calif.
Filed Jan. 24, 1963, Ser. No. 253,683
4 Claims. (Cl. 248—49)

This invention relates to a novel and useful fluid conduit adjustable support ramp and more specifically to a support ramp designed for use in supporting a flexible house trailer sewer conduit.

House trailer sewer conduits are flexible in order that the drain of a house trailer may be sealingly communicated with a permanently disposed sewer inlet adjacent to which the house trailer is parked. It is, of course, necessary that the house trailer sewer conduit be on constant incline from one end to the other with the discharge therein being disposed lowermost. The adjustable support ramp of the instant invention includes a plurality of generally horizontally disposed elongated support members which are aligned in end-to-end relation and pivotally secured at adjacent ends for rotation relative to each other about upstanding axes. Certain ones of the support members include depending legs which are adjustable in their effective height whereby the ramp for supporting the flexible house trailer sewer conduit may be disposed on rough ground and yet adjusted so as to support the house trailer conduit on an incline from one end to the other with the discharge end thereof disposed lowermost.

By providing the adjustable support ramp with leg means whose effective heights may be adjusted, the ramp may be positioned on very uneven ground and still utilized to support the house trailer sewer conduit in the proper manner.

Each of the leg means of the support ramp extends transversely of the ramp and includes a pair of spaced foot members including portions movable between retracted and extended positions projecting outwardly beyond the free ends of the leg means. In this manner, even unevenness of the ground extending transversely of the support ramp may be compensated for.

The main object of this invention is to provide a fluid conduit adjustable support ramp including means by which a flexible house trailer sewer conduit may be properly supported in a continuous inclined position with its discharge end disposed lowermost.

Another object of this invention, in accordance with the preceding object, is to provide a support ramp including articulated sections pivotally supported relative to each other for rotation about upstanding axes whereby the ramp may be shaped to follow a curving path in the inclined plane in which it is disposed.

Yet another object of this invention, in accordance with the preceding objects, is to provide a support ramp including adjustable leg means for supporting the ramp in a continuous inclined position and including means by which the leg means may be adjusted to compensate for unevenness of the supporting surface of said ramp extending both transversely and longitudinally thereof.

A still further object of this invention is to provide a support ramp constructed in a manner whereby it may be readily folded into a compact state for storage.

A final object of this invention to be specifically enumerated herein is to provide a fluid conduit adjustable support ramp which will conform to conventional forms of manufacture, be of simple construction and easy to erect so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the adjustable support ramp of the instant invention with an alternate position thereof shown in phantom lines;

FIGURE 2 is a partial diagrammatic view in side elevation of the adjustable support ramp;

FIGURE 3 is an enlarged fragmentary longitudinal vertical sectional view taken substantially upon the plane indicated by the section line 3—3 of FIGURE 1;

FIGURE 4 is an enlarged end elevational view taken substantially upon the plane indicated by the section line 4—4 of FIGURE 2;

FIGURE 5 is an enlarged fragmentary transverse vertical sectional view taken substantially upon the plane indicated by the section line 5—5 of FIGURE 2;

FIGURE 6 is an enlarged fragmentary longitudinal vertical sectional view taken substantially upon the plane indicated by the section line 6—6 of FIGURE 1; and FIGURE 7 is a side elevational view of the adjustable support ramp shown in a folded condition and on somewhat of an enlarged scale.

Referring now more specifically to the drawings the numeral 10 generally designates the adjustable support ramp of the instant invention which is shown in FIGURES 1 and 2 of the drawings supporting a flexible section 12 of a fluid conduit.

The adjustable support ramp 10 comprises a plurality of generally horizontally disposed elongated support members 14 and 16 which are disposed in end-to-end relation. Each pair of adjacent ends of the support members 14 and 16 are provided with aligned bores 18 and 20 and a pivot pin 22 is secured through each pair of aligned bores 18 and 20.

Certain ones of the support members 14 and 16 have pivot shafts 24 secured to their undersurfaces by means of fasteners 26. The pivot shafts 24 extend transversely of the certain ones of the support members 14 and 16 and each has a pair of clamp members 28 pivotally secured to its opposite ends. Each pair of clamp assemblies 28 includes a pair of generally parallel legs 30 and 32 between which a transversely extending leg panel 34 is secured. In this manner, each of the leg panels 34 has one marginal edge portion pivotally secured to the corresponding pivot shaft 24. One set of corresponding ends of the pivot shafts 24 have sector plates 36 secured thereto and the corresponding leg panel 34 has a latch member 38 pivotally secured thereto by means of a pivot fastener 40. Each of the latch members 38 is releasably engageable with the corresponding sector plate and may be utilized to secure the associated leg panel 34 in adjusted rotated positions relative to its supporting pivot shaft 24. In addition, each of the leg panels 34 has a pair of spaced foot members 42 pivotally secured thereto by means of suitable fasteners 44 which may be tightened to retain the foot members in adjusted rotated positions. The foot members 42 comprise cams including toe portions 46 which may be swung between retracted and extended positions projecting outwardly beyond the free ends of the corresponding leg panels 34.

Some of the support members 14 and 16 have a pair of transversely aligned and upstanding guide posts 48 secured thereto by means of suitable fasteners 50. It is, of course, to be understood that the lower ends of the guide posts 48 project through bores (not shown) formed in the corresponding support members 14 and 16.

From FIGURE 2 of the drawings it may be seen that one of the support members 14 is shorter than the other support members 14 and it may also be seen from FIGURE 1 of the drawings that one of the support members 16 is shorter than the other support members 16. It may further be seen from FIGURE 1 of the drawings that each of the support members 14 is longer than the support members 16 and that all but one of the leg panels 34 are pivotally secured to the corresponding one of the support members 14. Inasmuch as the support members overlap each other in the same manner from one end of the support ramp 10 to the other, it may be seen that the sections of the support ramp disposed between adjacent ones of the leg panels 34 may be rotated 180 degrees relative to each other in order that the adjustable support ramp may be folded in a compact state such as that illustrated in FIGURE 7 of the drawings.

As can best be seen from FIGURE 3 of the drawings, the leg panels 34 are of different length and it may further be seen that the leg panels 34 are progressively shorter toward one end of the adjustable support ramp 10.

In operation, the adjustable support ramp 10 may be unfolded from the compact position illustrated in FIGURE 7 of the drawings and the leg panels 34 may be secured in adjusted rotated positions such as those illustrated in FIGURE 3 of the drawings in order that the support ramp will be continually downwardly inclined toward one end of the support ram. In this manner, the flexible conduit 12 may be supported in a continuous inclined position. The high end of the fluid conduit may be operatively connected to the drain pipe of a house trailer and the low end of the conduit may be connected to a suitable permanently disposed ground drain pipe adjacent which the house trailer is parked. If it is desired to tilt the support ramp 10 to one side or the other the foot members 42 may be adjusted as desired. In addition the support ramp 10 may be snaked as illustrated in phantom lines in FIGURE 1 of the drawings in order to properly support the conduit 12 in a snaked position in order to pass around obstacles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid conduit adjustable support ramp comprising a plurality of generally horizontally disposed and elongated support members positioned in aligned end-to-end relation, means pivotally securing each pair of adjacent ends of said support members together for rotation relative to each other about upstanding axes, one set of corresponding ends of a set of said adjacent support members including depending leg means pivotally supported from the corresponding support members for pivotal movement between depending fully extended positions and collapsed positions closely underlying the corresponding ends of said set of adjacent support members with the free ends of said leg means projecting toward but spaced inwardly from the remote ends of said set of adjacent support members, coacting means carried by said leg means and said set of adjacent support members releasably securing said leg means in adjusted rotated positions, the support members of said set of support members being swingable relative to each other, when said leg means are fully collapsed, to positions in overlapped vertically stacked positions with said collapsed leg means sandwiched between the lower surfaces of the associated end of the corresponding support member and the upper surface of the end of the adjacent support member pivotally secured to said associated end.

2. The combination of claim 1 wherein each of said support members of said set of support members has a transversely extending pivot shaft supported therefrom and disposed beneath the end thereof from which the associated leg means is supported, said leg means being pivotally secured to said pivot shafts.

3. The combination of claim 1 wherein each of said leg means extends transversely of the corresponding support member and includes a pair of spaced foot members including portions movable between retracted and extended positions projecting outwardly beyond the free ends of the associated leg means.

4. The combination of claim 3 wherein each of said leg means includes means for releasably securing said foot members in adjusted extended positions.

References Cited in the file of this patent

UNITED STATES PATENTS

| | | |
|---|---|---|
| 2,127,398 | Freeman | Aug. 16, 1938 |
| 2,277,939 | Thalhammer | Mar. 31, 1942 |
| 2,494,302 | Mason | Jan. 10, 1950 |
| 2,550,201 | Parisi | Apr. 24, 1951 |
| 2,984,444 | Lewis | May 16, 1961 |
| 3,059,747 | Sullivan | Oct. 23, 1962 |